Inventors:
Hugo Eisenhut
Harry Sales

UNITED STATES PATENT OFFICE 2,206,169

LIGHT MODULATING SYSTEM

Hugo Eisenhut and Harry Eales, Jena, Germany, assignors to the firm Carl Zeiss, Jena, Germany Application September 27, 1938, Serial No. 231,924
In Germany September 30, 1937

8 Claims. (Cl. 250—7)

The present invention concerns an instrument for modulating rays, especially for light-ray telephony, and aims at eliminating disadvantages inherent in the known instruments of this kind with respect to the exploitation of the quantity of rays available for modulation.

The instruments known so far operate in the following manner. A condensing lens images the luminous body of a lamp on a small oscillating mirror, which may be plane or concave and lies at the focus of a convergent lens or a concave mirror. This convergent lens or concave mirror images the luminous body at the reception place. The oscillating mirror is in most cases so curved that the aperture of the condensing lens is imaged in the aperture of the convergent lens or the concave mirror. The oscillating mirror is operated by suitable means and, when this mirror is adjusted accordingly, the image of the condensing-lens aperture lies more or less in the aperture of the convergent lens or the concave mirror. This aperture is thus illuminated more or less, and the emitted light is modulated. With a view to making slight angular deflections of the oscillating mirror produce as strong a modulation as possible, the suggestion has been made to divide the aperture of the condensing lens and that of the convergent lens in grid-like fashion, thus causing angular deflections which the mirror effects at right angles to the direction of the grid bars, and which have a magnitude corresponding to half the breadth of a grid bar, to produce a complete modulation. The known instruments of this kind present, however, the inconvenience that only half the entire light aperture can be utilized. The purpose of the instrument according to the invention consists in eliminating this disadvantage and in using all the exploitable rays for the modulation.

The new instrument for modulating rays, especially in light-ray telephony or in apparatus with infra-red radiation, in which a convergent system (hereinafter termed "the first convergent system") combines at the place of an oscillating mirror rays emitted by a source of rays, and in which this mirror directs these rays to another convergent system (hereinafter termed "the second convergent system"), is characterized by a device which divides the system of ray pencils traversing the first convergent system into two systems of different foci, and by another device at the place of which the oscillating mirror images the said ray dividing device in such a manner that at a place in the rear of the second convergent system is produced an image of the ray source in which all the rays having traversed the first convergent system are combined when the mirror assumes its one extreme position, this place not being struck by any of the said rays when the mirror assumes its other extreme position.

The division of the system of ray pencils traversing the first convergent system into two systems of foci of their own can be effected, for instance, by a system of wedge-shaped refracting prisms. This system of wedge-shaped prisms is so disposed near the first convergent system, which constitutes a condensing system, that the system of ray pencils emitted by the ray source produces on the oscillating mirror two images lying next to each other. Between the oscillating mirror and the second convergent system is disposed another system of wedge-shaped refracting prisms, on which the wedge-shaped prisms of the first convergent system are imaged by the oscillating mirror. In each of the two systems of wedge-shaped prisms, the height of the wedge-shaped prisms conveniently corresponds to the height of the intervals between these prisms, and the angle of refraction of the first said system of wedge-shaped prisms, the focal length of the oscillating mirror and the distances of the two systems of wedge-shaped prisms from the oscillating mirror are such that in the image of the first said system of wedge-shaped prisms at the place of the said other system of wedge-shaped prisms the heights of and the intervals between the prisms are as great as the heights of and the intervals between the prisms of the said other system.

With a view to reducing the image errors, it is advisable to so construct the first convergent system that it consists of a plurality of lenses between which the rays of the pencil are approximately parallel, and to place between these lenses the wedge-shaped prisms of the first said prism system. The same holds good for the second convergent system and the said other prism system. The wedge-shaped prisms can be fixed to a lens of the convergent system or placed in the ray path separately from the lenses, for instance by means of a frame.

The division of the system of ray pencils into two systems having foci of their own can be effected also by means of a condensing system having a convergent mirror. The first convergent system is, accordingly, a convergent mirror the concave surface of which is silvered in the form of strips separated by intervals, and the convex rear side of which is silvered in the form of strips coordinated to the intervals between the strips on the interior surface, the said two surfaces being bent in such a manner that a ray source is imaged on the oscillating mirror in two images lying next to each other.

The accompanying drawings show in schematical constructional examples how the idea underlying the invention can be carried into practice with respect to a light-ray telephone.

Figure 1:
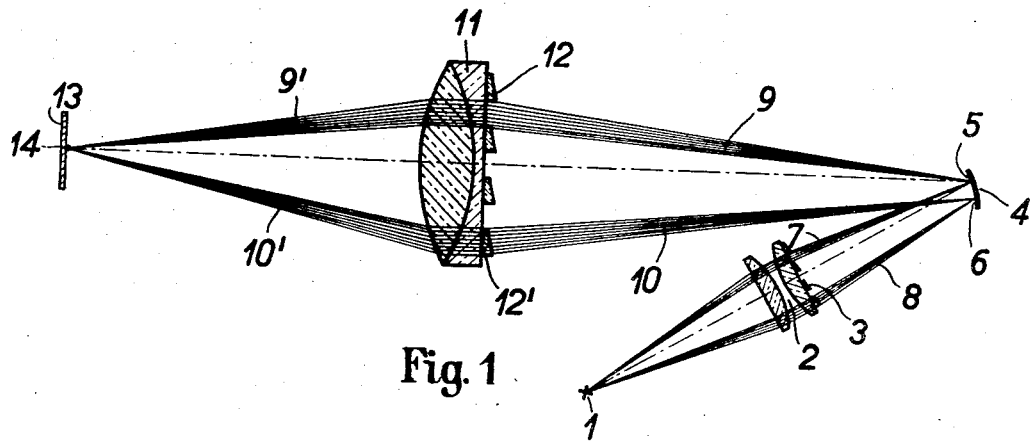
Figures 1, 2 and 3 show an instrument having systems of wedge-shaped prisms. For convenience, the path of the rays corresponding to the principal positions of the oscillating mirror, is schematically represented in two ray pencils determining the places of the images.
Figure 2:
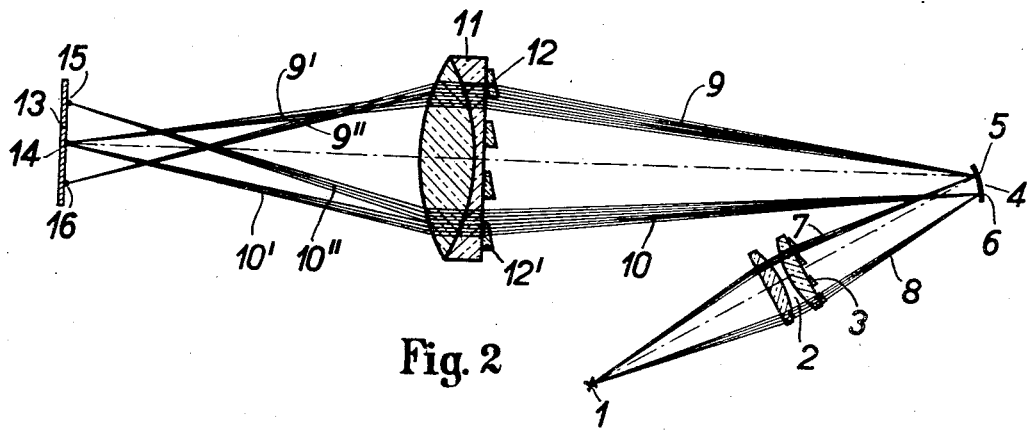
Figure 3:
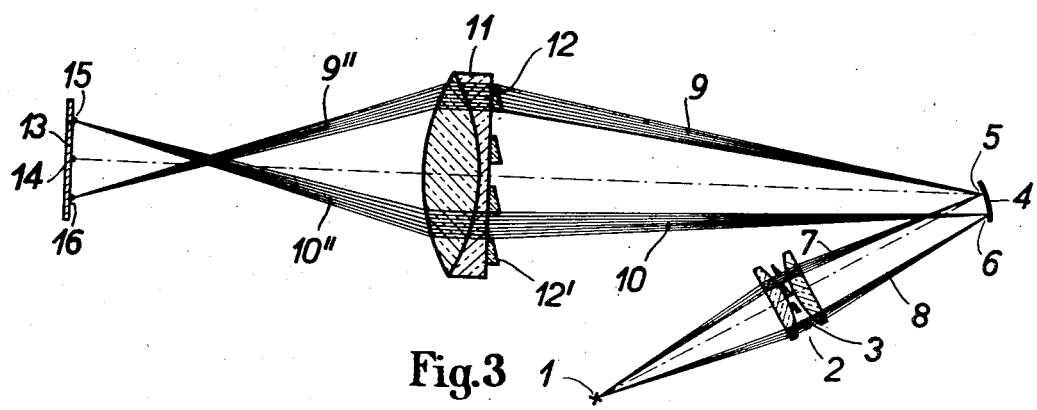

The oscillating mirror need effect only small rotations for a complete modulation from "bright" to "dark." Figure 1 shows the extreme position in anti-clockwise rotation, Figure 2 shows the medial position, and Figure 3 shows the extreme position in clockwise rotation.

In Figures 1 to 3, 1 is a light-source, 2 is the first convergent system having the system of wedge-shaped refracting prisms 3, and 4 is the oscillating mirror, which is concave and on which the images 5 and 6 of the light source 1 are produced.

Only ray pencils 7 and 8 are followed up in the drawings, these pencils passing in Figure 1 as pencils 9 entirely through the intervals between the wedge-shaped prisms 12, and the pencils 10 striking entirely the wedge-shaped prisms 12'. When the oscillating mirror assumes the position represented in Figure 1, the ray pencils 9' and 10' produce in the plane 13 the image 14, which is of maximum brilliancy.

In Figure 2, the concave mirror 4 is rotated relatively to the position shown in Figure 1 clockwise through a small angle. The corresponding intermediate position of this mirror 4 entails a division of the pencils 9 and 10 into pencils 9', 9" and 10', 10", respectively. The plane 13 now shows the principal image 14 with a brilliancy only half as great as that obtained according to Figure 1. There appear also two secondary images 15 and 16, which are half as bright as the principal image 14.

In Figure 3, the concave oscillating mirror 4 is rotated further in clockwise direction. In the corresponding extreme position of the mirror 4, all ray pencils pass at the sides of the place of the principal image, which disappears completely.

Figure 4:
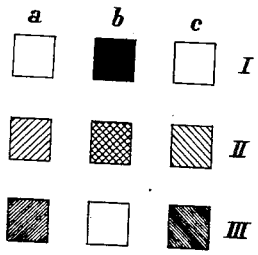
Figure 4 shows the repartition of light on the three images appearing in the constructional example illustrated by Figures 1 to 3 in the rear of the second convergent system.

Figure 4 illustrates the different brilliancies of the images in the plane 13. In combination with Figures 1 to 3, Figure 4 shows that all the available light is completely modulated and that the rapidity of the modulation characteristic is doubled. In Figure 4, I, II and III signify the different brilliancies corresponding to the mirror positions shown in Figure 1, 2 and 3, respectively. $a$ is the left secondary image 16, $c$ is the right secondary image 15, and $b$ is the principal image 14. Hatching from the right to the left downward signifies the brilliancy of the corresponding surface of the image 5 on the oscillating mirror, and hatching from the left to the right downward signifies the brilliancy of the image 6 on the oscillating mirror.

Figure 5:
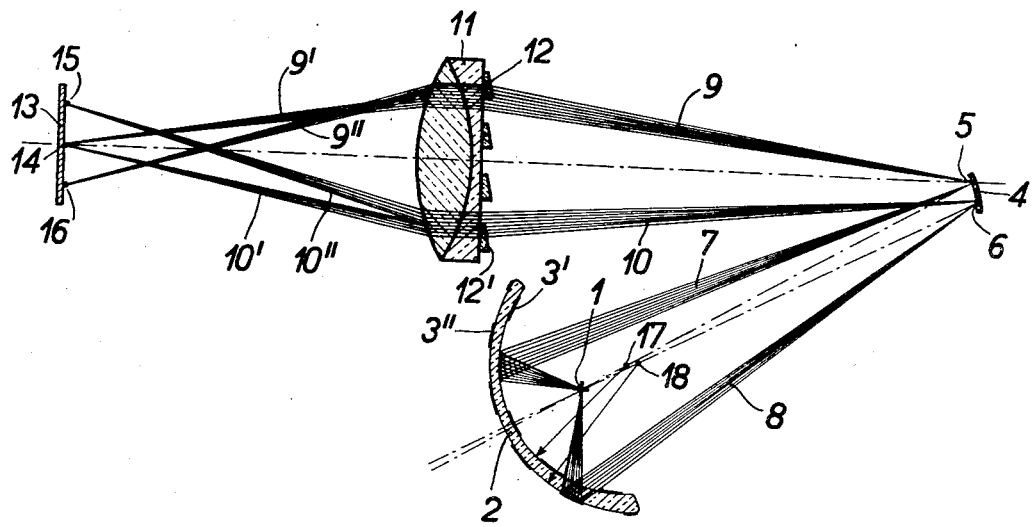
Figure 5 shows a constructional example in which there is used for the first convergent system, having wedge-shaped refracting prisms, a concave condensing mirror silvered in the form of strips.

In Figure 5, 2 is the concave condensing mirror, which has silver layers 3' and 3" in the form of strips. The centre of curvature 18 of the exterior surface 3" is displaced relatively to the centre of curvature 17 in order to provide that two images 5 and 6 of the light source appear on the oscillating mirror 6. The remaining reference numerals correspond to reference numerals in Figures 1 to 3.

Figure 6:
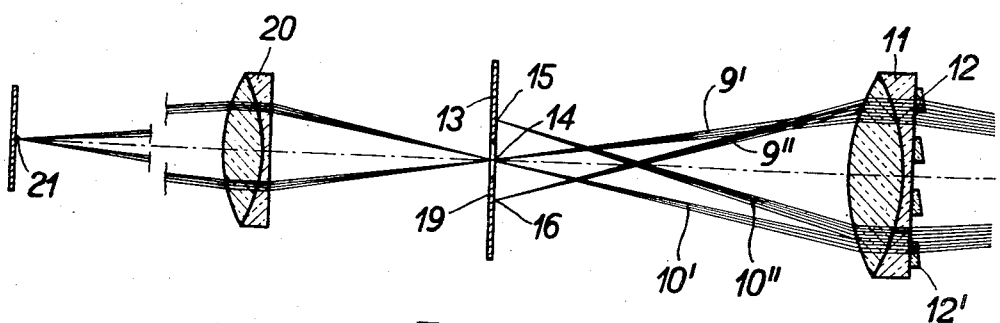
Figure 6 shows the ray path in an arrangement for stopping down the secondary images arising in the rear of the second convergent system.

Figure 6 shows a possibility of stopping down the secondary images 15 and 16, which are not necessary at the reception place and may impair the principal image. The secondary images can be used, however, as separate images or images overlapping each other, for the control of the emitted principal rays. In the constructional example according to Figure 6, a diaphragm 19 is disposed at the place of the image plane 13, and behind this place is a third convergent system 20, which images the principal image at the reception place 21. The remaining reference numerals in Figure 6 correspond to reference numerals in Figures 1 to 3.

We claim:

1. An instrument for modulating the rays of the visible light spectrum and the adjacent spectral ranges, especially for light-ray telephony, comprising a ray source adapted to emit a system of ray pencils, a first convergent optical system lying in the path of these rays, a ray dividing device, a concave mirror adapted to oscillate according to the oscillations of the frequencies of modulation, a second convergent optical system, and another ray dividing device, said first convergent system being adapted to focus at the place of said mirror the rays proceeding from said ray source, said first ray dividing device lying in said system of ray pencils traversing said first convergent system and being adapted to split up said system of ray pencils into two systems of ray pencils of different foci, said mirror being adapted to project on said other ray dividing device each of said split up systems of ray pencils.

2. An instrument for modulating the rays of the visible light spectrum and the adjacent spectral ranges, especially for light-ray telephony, comprising a ray source adapted to emit a system of ray pencils, a first convergent optical system lying in the path of these rays, a ray dividing device, a concave mirror adapted to oscillate according to the oscillations of the frequencies of modulation, a second convergent optical system, and another ray dividing device, said first convergent system being adapted to focus at the place of said mirror the rays proceeding from said ray source, said first ray dividing device lying in said system of ray pencils traversing said first convergent system, and consisting of a system of wedge-shaped refracting prisms disposed near said first convergent system and being adapted to split up said system of ray pencils into two systems of ray pencils of different foci, said mirror being adapted to project on said other ray dividing device each of said split up systems of ray pencils.

3. An instrument for modulating the rays of the visible light spectrum and the adjacent spectral ranges, especially for light-ray telephony, comprising a ray source adapted to emit a system of ray pencils, a first convergent optical system lying in the path of these rays, a ray dividing device, a concave mirror adapted to oscillate according to the oscillations of the frequencies of modulation, a second convergent optical system, and another ray dividing device, said first convergent system being adapted to focus at the place of said mirror the rays proceeding from said ray source, said first ray dividing device lying in said system of ray pencils traversing said first convergent system, and consisting of a system of wedge-shaped refracting prisms disposed near said first convergent system and being adapted to split up said system of ray pencils into two systems of ray pencils of different foci, said mirror being adapted to project on said other ray dividing device each of said split up systems of ray pencils, said other ray dividing device consisting of a system of wedge-shaped refracting prisms so arranged between said oscillating mirror and said second convergent system that by said mirror an image of said first system of refracting prisms is produced on said other system of refracting prisms.

4. An instrument for modulating the rays of the visible light spectrum and the adjacent spectral ranges, especially for light-ray telephony, comprising a ray source adapted to emit a system of ray pencils, a first convergent optical system lying in the path of these rays, a ray dividing device, a concave mirror adapted to oscillate according to the oscillations of the frequencies of modulation, a second convergent optical system, and another ray dividing device, said first convergent system being adapted to focus at the place of said mirror the rays proceeding from said ray source, said first ray dividing device lying in said system of ray pencils traversing said first convergent system, and consisting of a system of wedge-shaped refracting prisms disposed near said first convergent system and being adapted to split up said system of ray pencils into two systems of ray pencils of different foci, said mirror being adapted to project on said other ray dividing device each of said split up systems of ray pencils, said other ray dividing device consisting of a system of wedge-shaped refracting prisms so arranged between said oscillating mirror and said second convergent system that by said mirror an image of said first system of refracting prisms is produced on said other system of refracting prisms, in each of said two systems of refracting prisms the height of the prisms corresponding to the intervals between these prisms, the angle of refraction of the prisms of said first system, the focal length of said oscillating mirror and the distances of said two prism systems from said oscillating mirror being such that in said image projected on said other prism system the heights of and the intervals between the prisms are as great as the heights of and the intervals between the prisms of said other prism system.

5. An instrument for modulating the rays of the visible light spectrum and the adjacent spectral ranges, especially for light-ray telephony, comprising a ray source adapted to emit a system of ray pencils, a first convergent optical system lying in the path of these rays, a ray dividing device, a concave mirror adapted to oscillate according to the oscillations of the frequencies of modulation, a second convergent optical system, and another ray dividing device, said first convergent system being adapted to focus at the place of said mirror the rays proceeding from said ray source, said first ray dividing device lying in said system of ray pencils traversing said first convergent system, and consisting of a system of wedge-shaped refracting prisms disposed near said first convergent system and being adapted to split up said system of ray pencils into two systems of ray pencils of different foci, said mirror being adapted to project on said other ray dividing device each of said split up systems of ray pencils, said other ray dividing device consisting of a system of wedge-shaped refracting prisms so arranged between said oscillating mirror and said second convergent system that by said mirror an image of said first system of refracting prisms is produced on said other system of refracting prisms, each of said two convergent systems consisting of a plurality of lenses between which the systems of ray pencils traversing these convergent systems have parallel rays, the prisms of the said first prism system being disposed between said lenses of said first convergent system, the prisms of said other prism system being disposed between said lenses of said second convergent system.

6. An instrument for modulating the rays of the visible light spectrum and the adjacent spectral ranges, especially for light-ray telephony, comprising a ray source adapted to emit a system of ray pencils, a first convergent optical system lying in the path of these rays, a ray dividing device, a concave mirror adapted to oscillate according to the oscillations of the frequencies of modulation, a second convergent optical system, and another ray dividing device, said first convergent system being adapted to focus at the place of said mirror the rays proceeding from said ray source, said first ray dividing device lying in said system of ray pencils traversing said first convergent system, and consisting of a system of wedge-shaped refracting prisms disposed near said first convergent system and being adapted to split up said system of ray pencils into two systems of ray pencils of different foci, said mirror being adapted to project on said other ray dividing device each of said split up systems of ray pencils, said other ray dividing device consisting of a system of wedge-shaped refracting prisms so arranged between said oscilating mirror and said second convergent system that by said mirror an image of said first system of refracting prisms is produced on said other system of refracting prisms, the refracting prisms of the prism systems being disposed on and fixed to a lens of the corresponding convergent system.

7. An instrument for modulating the rays of the visible light spectrum and the adjacent spectral ranges, especially for light-ray telephony, comprising a ray source adapted to emit a system of ray pencils, a first convergent optical system lying in the path of these rays, a ray dividing device, a concave mirror adapted to oscillate according to the oscillations of the frequencies of modulation, a second convergent optical system, and another ray dividing device, said first convergent system being adapted to focus at the place of said mirror the rays proceeding from said ray source, said first ray dividing device lying in said system of ray pencils traversing said first convergent system and consisting of a convergent glass mirror whose concave interior side faces said ray source and has a plurality of silver strips separated from each other by intervals and whose convex side remote from said ray source has a plurality of silver strips coordinated to said intervals between the silver strips on the concave interior surface, both said sides having such a curvature that two juxtaposed images of said ray source are produced on said oscillating mirror.

8. An instrument for modulating the rays of the visible light spectrum and the adjacent spectral ranges, especially for light-ray telephony, comprising a ray source adapted to emit a system of ray pencils, a first convergent optical system lying in the path of these rays, a ray dividing device, a concave mirror adapted to oscillate according to the oscillations of the frequencies of modulation, a second convergent optical system, another ray dividing device, and a diaphragm, said first convergent system being adapted to focus at the place of said mirror the rays proceeding from said ray source, said first ray dividing device lying in said system of ray pencils traversing said first convergent system and being adapted to split up said system of ray pencils into two systems of ray pencils of different foci, said mirror being adapted to project on said other ray dividing device each of said split up systems of ray pencils, said diaphragm being disposed at the place of the ray-source image in the rear of said second convergent system, the rays passing at the sides of said image being stopped down by said diaphragm, and a third convergent system disposed in the rear of said second convergent system, said third convergent system producing at a place receiving the modulated rays a final image of said ray-source image.

HUGO EISENHUT.
HARRY EALES.